United States Patent [19]

Ostler

[11] 4,350,118
[45] Sep. 21, 1982

[54] AUTOMATIC FEEDING APPARATUS
[75] Inventor: Earl W. Ostler, Billings, Mont.
[73] Assignee: Agri-Systems, Billings, Mont.
[21] Appl. No.: 243,464
[22] Filed: Mar. 13, 1981
[51] Int. Cl.³ .............................................. A01K 5/02
[52] U.S. Cl. ................................................ 119/51 R
[58] Field of Search ....................... 119/51 R, 52 AF; 235/443, 487

[56] References Cited
U.S. PATENT DOCUMENTS

| | | | |
|---|---|---|---|
| 3,465,724 | 9/1969 | Broadbent | 119/51 R |
| 3,541,995 | 11/1970 | Fathauer | 119/51 R |
| 3,705,294 | 12/1972 | Kuehnle et al. | 235/487 |
| 3,750,626 | 8/1973 | Smith | 119/51 R |
| 4,129,855 | 12/1978 | Rodrian | 119/51 R X |
| 4,162,683 | 7/1979 | Brooks | 119/52 AF X |
| 4,279,219 | 7/1981 | Brooks | 119/51 R |

Primary Examiner—Paul J. Hirsch
Assistant Examiner—Robert P. Swiatek
Attorney, Agent, or Firm—Arthur L. Urban

[57] ABSTRACT

Automatic animal feeding apparatus including a feeding portion, a feed supplying portion, and a feed control portion; the feeding portion including a plurality of feeding stations, the feed control portion including a light source and a plurality of spaced sensing mechanisms associated therewith at each of the feeding stations, the sensing mechanism being capable of being activated by light supplied from the light source, mechanism associated with an animal for diverting light from the light source with respect to the sensing mechanism in a predetermined pattern, the sensing mechanism being capable of transmitting signals to deciphering mechanism located closely adjacent to the sensing mechanism at each feeding station, at least two of the sensing mechanisms detecting proper orientation of the animal associated mechanism with the sensing mechanism, an odd number of the sensing mechanisms in addition to the orientation detecting sensing mechanism detecting an identification pattern of a particular animal, the deciphering mechanism of each of the feed control portions being connected electrically with deciphering mechanism of all other feeding stations and with interrogating mechanism, the interrogating mechanism sequentially searching each of the deciphering mechanisms, memory mechanism, mechanism for comparing signals from the interrogating mechanism with the memory mechanism, mechanism for selectively activating feed transfer mechanism, recording mechanism for compiling a log of feed material offered.

9 Claims, 6 Drawing Figures

AUTOMATIC FEEDING APPARATUS

This invention relates to a novel feeding apparatus and more particularly relates to a new apparatus for feeding animals.

Many years ago, it was customary to feed animals simply by placing the food on the ground or in a pan or bucket. While this arrangement is satisfactory for a single animal, problems can arise when more than one animal is being fed. For example, one of the animals may be more aggressive and eat not only his own share but also that of the other animals. If an animal does not receive an adequate feed ration, it will not grow properly. Furthermore, failure to eat is a common way for an animal owner to detect at an early stage whether an animal is sick. However, if a number of animals are being fed together, their owner cannot readily detect if one of the animals is not eating and is sick since the food would always be eaten if not by one animal then another.

As animal raising has become more scientific, animal owners have attempted to keep a record of the productivity of each animal. In this way, a farmer or rancher can determine which animals are least productive and these animals can be sold or slaughtered. It is relatively easy to weigh an animal periodically to determine its weight gain or to keep a record of the milk a cow gives and thus determine the output of the animal. However, it is much more difficult to determine the intake of an animal, that is, the quantity of food eaten by a particular animal where a large number of animals are involved.

One way to keep a record of the feed an animal eats is to feed each animal in an individual closed stall. However, with cattle, horses or other animals that are kept in fenced areas it is difficult to determine the feed consumed by each animal. Generally, ranchers simply observe their animals occasionally as they are eating and if they are eating normally when observed, the ranchers assume that the same eating patterns are taking place at the times the animals are not being observed. At best, this is a haphazard and inaccurate way of determining feeding habits and amounts consumed. Furthermore, it is a very nebulous basis on which to decide which animals to keep and which to eliminate from a herd.

It has been proposed to utilize automatic feeding systems to provide a way to control the feed received by each animal. One system utilizes a computer to control a number of individual feeding stations. Each feeding station has a sensor which can detect or read the code on the tag hanging from the neck of each animal. A signal is sent by the sensor to the computer which is programmed to deliver a given amount of feed in increments to a particular animal each day or fraction thereof. The computer also is programmed to record the quantity of feed delivered to a particular animal standing at the feeding station. Thus, the computer can make available to a rancher a record of how much feed a given animal has eaten on a particular day. Such a record can provide a sound factual basis for deciding which animals are least productive and thus should be eliminated from a herd.

Although the above animal feeding system in theory appears to provide a useful way of keeping records of feed consumed by an animal, in practice the system may not function in a trouble free manner. The successful operation of the system requires that the system properly identify the animal at the feed station. If the system does not properly identify each animal, the errors will result in the animals being fed the wrong quantities of food. Thus, the feeding system may be no better than simple non-regulated feeding.

The failure of the automatic feeding system may be due to the sensor being unable to pick up the identity of a particular animal. If the system does not sense that an animal is waiting to be fed, the animal may wait at the feed station and not only not be fed but also will prevent other animals from being fed. On the other hand, if the system identifies an animal incorrectly, one animal will get another animal's feed ration and the second animal will not receive the food to which it is entitled. Unfortunately, the animal owner will not be aware of the misfeeding and will assume that the second animal did not request its complete feed ration.

Further problems with some automatic feeding systems may be in programming and recording functions. Ordinarily, the programming and recording apparatus must be placed close to the feeding stations. This may require that the feeding stations be located closer together than desired. Alternatively, systems may require extra programmers and recorders for individual stations or separate groups of stations. Such a requirement will of necessity add considerably to the cost of a system which includes a large number of feeding stations. Thus, it may be necessary for the animal owner to make the rounds of a number of programmers and recorders located at different locations. In addition, with such systems, the collected data may have to be collated to provide a master report of the feeding activities of a herd.

The present invention provides a novel animal feeding apparatus which automatically delivers feed to animals at a large number of feeding stations at widely spaced locations. The feeding apparatus provides a programming function for selecting a feeding schedule for each individual animal. Also, the apparatus provides a recording function for logging the feed received by each animal during a given time period. The programming and recording functions as well as the operating controls of the feeding apparatus may be located at a point remote from the feeding stations. In addition, the apparatus can collect and corrolate information from a large number of feeding stations at widely spaced locations.

The feeding apparatus of the invention provides a high degree of accuracy both in detecting an animal awaiting feeding and in identifying a particular animal. The apparatus further provides a high degree of reliability in the furnishing of feeding records to the owner of the animals.

The animal feeding apparatus of the present invention is simple in design. The apparatus can be fabricated from commercially available materials and components using conventional manufacturing techniques. The feeding apparatus of the invention can be installed easily either as a part of new facilities or with feeding areas presently in use.

Other benefits and advantages of the novel feeding apparatus of the present invention will be apparent from the following description and the accompanying drawings in which.

Figure 1:
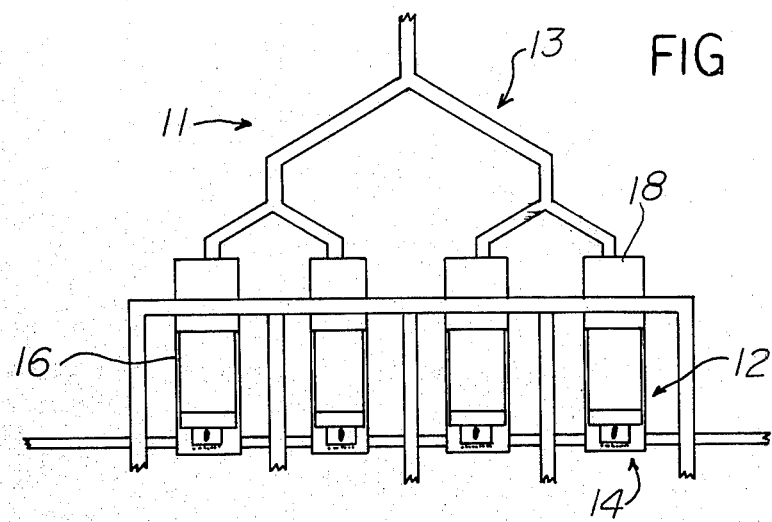
FIG. 1 is a schematic illustration of one form of animal feeding apparatus of the invention.
Figure 2:
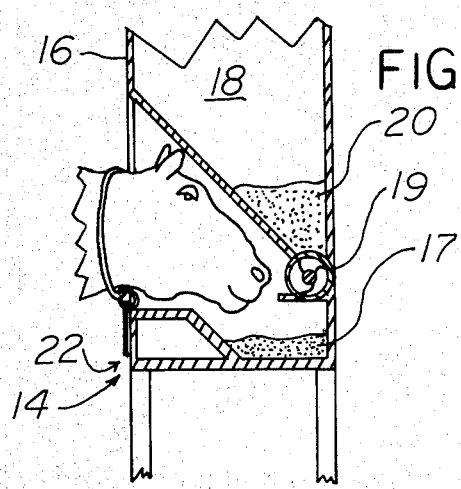
FIG. 2 is an enlarged fragmentary side view in section of the feeding apparatus shown in FIG. 1.
Figure 3:
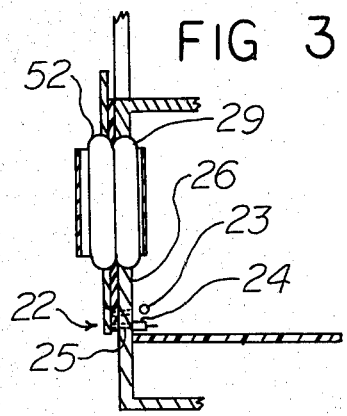
FIG. 3 is an enlarged fragmentary sectional view of the animal tag and sensing portion of the feeding apparatus shown in FIG. 2.
Figure 4:
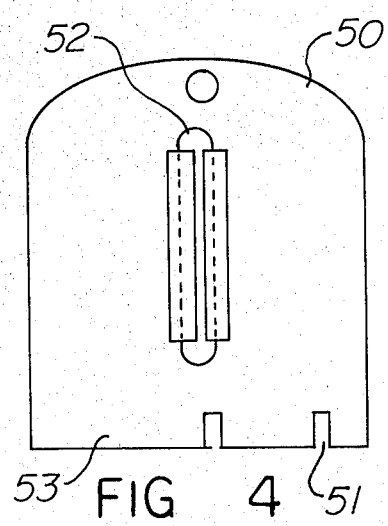
FIG. 4 is a front view of an animal identification tag of the feeding apparatus shown in FIG. 2.
Figure 5:
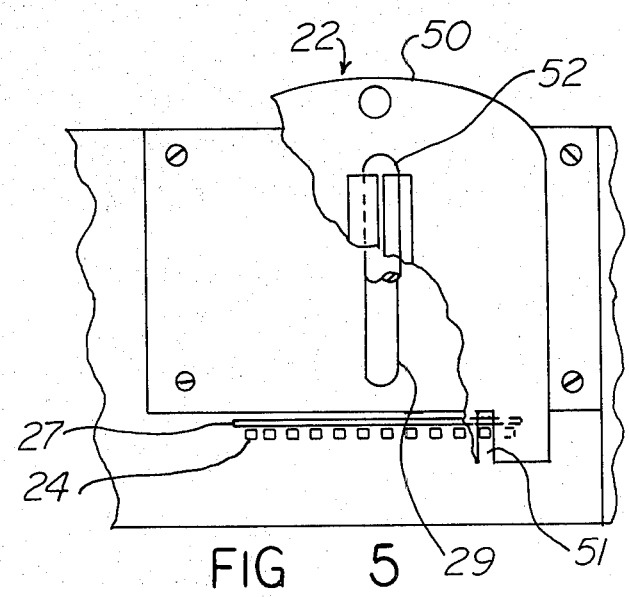
FIG. 5 is an enlarged front view of the animal identifying portion with a tag in position of the feeding apparatus shown in FIG. 2.

As shown in the drawings, one form of the novel automatic animal feeding apparatus 11 of the invention includes a feeding portion 12, a feed supplying portion 13 and a feed control portion 14. The feeding portion 12 includes at least one feeding station and preferably a plurality of feeding stations 16. Each feeding station 16 includes a trough member 17.

The feed supplying portion 13 includes feed storage means shown as hoppers 18. Hoppers 18 may be associated with one or more feeding stations 16 as desired. Transfer means shown as auger 19 is associated with the feed storage means and is capable of conveying feed material 20 contained in hopper 18 to the feed trough member 17.

Feed control portion 14 is operatively connected to the feed transferring auger 19. The feed control portion 14 includes animal identifying means 22. The animal identifying means 22 includes a light source 23. Also, the identifying means 22 includes a plurality of spaced sensing elements 24. The sensing elements 24 are located adjacent to light source 23. As shown in the drawings, the light source 23 and the sensing elements 24 advantageously are disposed below and adjacent to the feed trough member 17. The light source 23 and the sensing elements 24 preferably are arranged with their active surfaces disposed in a generally vertical plane.

Advantageously, the light source 23 and the sensing elements 24 are associated in a unitary structure. The sensing elements may extend through openings 25 in a plate member 26. Likewise, light source 23 advantageously may be disposed behind an opening 27 in plate member 26. The opening 27 is adjacent to the sensing elements 24. Preferably, the sensing elements 24 are uniformly spaced in a pattern such as the horizontal row shown in the drawings. Orienting means such as magnet 29 may be mounted on the plate member 26 adjacent the light source 23 and sensing elements 24.

Figure 6:
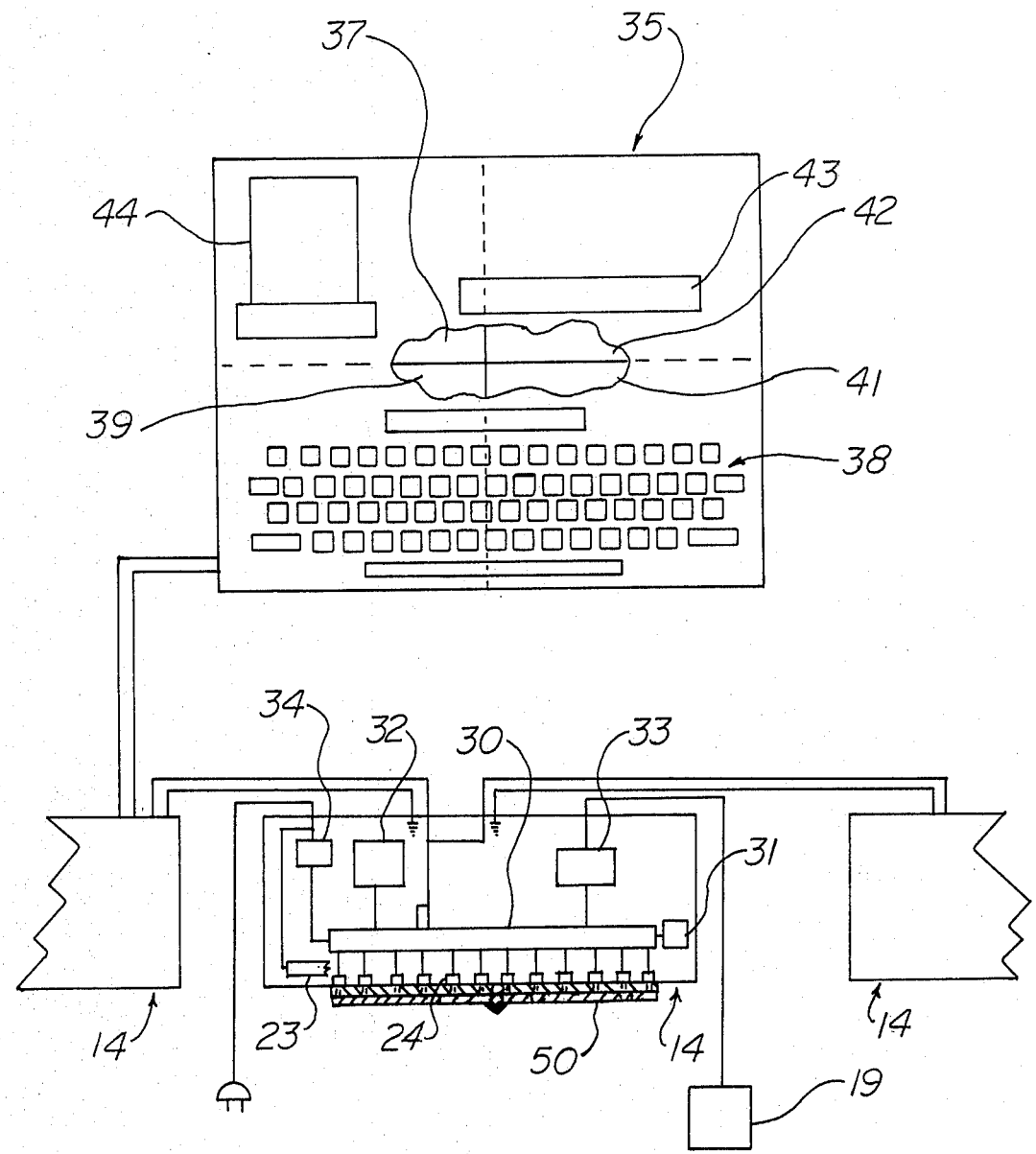
FIG. 6 is a sectional view of the identifying portion of FIG. 5 with a schematic diagram of one form of an electrical circuit of the feeding apparatus.

FIG. 6 illustrates one form of electrical circuitry suitable for the animal feeding apparatus 11 of the drawings. Sensing elements 24 are connected to deciphering means located closely adjacent to the sensing elements. The deciphering means shown as an addressable asynchronous receiver/transmitter 30 has a timing oscillator 31 connected thereto. The receiver/transmitter 30 also is connected with an address selector switch 32 and a relay 33. The relay 33 is connected with auger 19. The components are energized with a power supply 34.

The receiver/transmitter 30 is connected with the receiver/transmitters (not shown) of other feeding stations 16 by a single pair of lead wires. One of the feeding stations 16 is connected to control means 35 including a memory section 37, an interrogating section 39, a comparison section 41 and a recording section 42. The connection between the control means 35 and the feeding stations 16 is a serial port connection also with a single pair of lead wires.

The memory section 37 of the control means 35 is capable of receiving and storing an animal feeding schedule which can be entered through a keyboard 38. The interrogating section 39 of the control means 35 is capable of addressing each of the feeding station receiver/transmitters 30. The comparison section 41 is capable of comparing a signal received from the interrogating section 39 with the feeding schedule entered in the memory section 37. The recording section 42 may include a display section 43 and a record reproducing means 44.

The control means 35 advantageously includes a nonvolatile memory section 37 that is battery powered. This maintains the feeding schedule and log in the event of a power failure.

In the use of the novel animal feeding apparatus of the invention shown in the drawings, the animals to be fed have identifying means such as tags 50. Each tag 50 is coded, for example, by cutting notches 51 along an edge such as the bottom edge thereof. The notches 51 are sized and spaced to align with the sensing elements 24. The notches on the tag of each animal are different to provide an identification of the respective animal.

The memory section 37 previously has had a feeding schedule entered therein. This schedule will include the quantities of feed that the owner wishes each particular animal to receive during a given time period, e.g. 12 hours.

As an animal approaches one of the feeding stations and places its head into trough member 17, tag 50 which may include a magnet 52 is drawn against the sensing elements 24 by magnet 29 on the face of the plate member 26 adjacent to the sensing elements 24. The two magnets 29 and 52 draw the tags into proper alignment with the sensing elements. In this position, two sensing elements 24, preferably the end sensing elements, check alignment of the tag.

The operation of the feeding apparatus 11 of the invention will be described with reference to a preferred embodiment thereof. Phototransistors being utilized as sensing elements 24 will be activated by light from source 23 being reflected off solid portions 53 of tag 50 and onto the phototransistors aligned therewith. These phototransistors will send signals to the receiver/transmitter 30 indicating that the tag is properly aligned with respect to the row of phototransistors.

At the same time, light will be reflected from other solid portions 53 of the tag onto the other phototransistors aligned with the solid portions. The phototransistors which are aligned with the notches will not be activated since light will not be reflected onto the surface of the phototransistors. When the tag is properly aligned, an odd number of phototransistors are activated. This may be accomplished by utilizing a zero recording phototransistor with other phototransistors in a conventional binary code arrangement.

The deciphering receiver/transmitter 30 having received the signals from the appropriate phototransistors identifies a particular animal. This information is available for interrogation by section 39 of control 35. Interrogating section 39 continuously and sequentially searches the receiver/transmitter 30 of each feeding station 16 in a rapid sequence determined by timing oscillator 31. The receiver/transmitter 30 of each feeding station 16 is coded by selector switch 32 to provide for identification of the receiver/transmitter by the interrogating section 39.

When the interrogating section 39 determines that a particular animal is at a specific feeding station, this information is noted by comparing section 41. To insure that the animal at the feeding station is ready to be fed rather than simply passing by, the comparing section may wait for a repeat of the signal several or more times before comparing the animal identification with the feeding schedule and log stored in memory section 37.

The comparing section 41 then checks the feeding schedule to determine if the animal has received its complete ration for the current time interval. If not, the comparing section 41 will send a signal back to receiver/transmitter 30 to activate relay 33. The relay 33 energizes auger 19 to convey feed material from hopper 18 into trough member 17 where it can be consumed by the animal at the trough.

The quantity of feed supplied to the animal is recorded for later tabulation and reporting to the owner. At regular preselected time intervals or when the owner desires, a log of the feed that has been given to each of the animals is delivered for inspection by the owner. This can be accomplished by recording section 42 on a tape or other record reproduction 44.

The control means 35, as pointed out above, may be positioned at a location remote from the feeding stations. Also, the feeding stations 16 may be at locations remote from one another. The various components are connected to a suitable electrical power source (not shown).

The control means 35 advantageously may be a computer including interrogating, memory and comparison sections. A number of different computers are suitable for use with the feeding apparatus of the invention. The selection of a specific computer may depend upon the feeding capabilities desired. A particularly useful computer is the Rockwell AIM 65 computer and models similar thereto.

The feeding apparatus of the invention may be operated at a variety of voltages depending upon the particular sensing elements employed. Advantageously, the feeding system may be operated at 12 volts. In this case, the sensing elements may be Fairchild FPT 110-A phototransistors or equivalent components. Preferably, the sensing elements provide a voltage drop when activated by light to about one-fifth to one-twelfth the original voltage. The FPT 110-A phototransistors provide a voltage drop from 12 volts to less than about one volt.

The above description and the accompanying drawings show that the present invention provides a novel animal feeding apparatus which feeds animals simply and conveniently. The feeding apparatus of the invention automatically delivers feed to animals according to a preselected feeding schedule. Further, the feeding apparatus periodically provides a record of the feed consumed by each animal of a herd.

The programming and recording portions of the feeding apparatus can be located at points remote from the feeding stations. Furthermore, the programming and recording apparatus can collect and corrolate data from a large number of feeding stations at widely spaced locations.

The feeding apparatus of the present invention provides a high degree of accuracy and reliability both in detecting an animal waiting to be fed at a feeding station and also in identifying which animal is there. Thus, the records furnished by the feeding apparatus provide an accurate basis for determining animal productivity.

The animal feeding apparatus of the invention is simple in design and relatively inexpensive to manufacture. The apparatus can be fabricated from commercially available materials and components. Conventional manufacturing techniques can be employed in its fabrication.

The feeding apparatus can be utilized with existing feeding facilities as well as being incorporated into new feeding installations. Since the apparatus can be manufactured in a number of subassemblies, it can be installed by the rancher or farmer with a minimum of technical experience or skills.

It will be apparent that various modifications can be made in the particular feeding apparatus described in detail above and shown in the drawings within the scope of the invention. The size, configuration and arrangement of the various components can be changed to meet specific requirements. For example, different types of sensing elements can be employed. Also, the alignment and/or spacing of the sensing elements can be varied. Moreover, different identifying means can be employed on the animals. In addition, the means for handling the feed can be modified or changed as desired. Therefore, the scope of the invention is to be limited only by the following claims.

What is claimed is:

1. Automatic animal feeding apparatus including a feeding portion, a feed supplying portion, and a feed control portion; said feeding portion including a plurality of feeding stations, said feed supplying portion including feed storage means for supplying said feeding stations, mechanized transfer means capable of selectively conveying feed material from said feed storage means to each of said feeding stations, said feed control portion including a light source and a plurality of spaced sensing means at each of said feeding stations, said sensing means being capable of being activated by light supplied from said light source, means carried by an animal for diverting light from said light source with respect to said sensing means in a predetermined pattern, said sensing means being capable of transmitting signals to deciphering means located closely adjacent to said sensing means at each feeding station, at least two of said sensing means detecting proper orientation of said animal carried means with said sensing means, an odd number of said sensing means in addition to said orientation detecting sensing means detecting an identification pattern of a particular animal, said deciphering means of said feed control portion being connected electrically with deciphering means of all other feeding stations and with interrogating means, said interrogating means sequentially searching each of said deciphering means in a continuous rapidly repeating sequence, memory means capable of accepting an animal feeding schedule, means for comparing signals from said interrogating means with said animal feeding schedule, means for selectively activating said feed transfer means, recording means for compiling a log of quantities of feed material offered to particular animals and the time periods of such offerings.

2. Automatic animal feeding apparatus according to claim 1 wherein said interrogating means is connected with one of said deciphering means through a serial port connection with a single pair of lead wires.

3. Automatic animal feeding apparatus according to claim 1 wherein said interrogating means is capable of searching said deciphering means of each feeding station sequentially at least once each second.

4. Automatic animal feeding apparatus according to claim 1 wherein said deciphering means includes an addressable asynchronous receiver/transmitter.

5. Automatic animal feeding apparatus according to claim 1 wherein said sensing means includes phototransistors.

6. Automatic animal feeding apparatus according to claim 5 wherein said phototransistors are normally shielded from said light source.

7. Automatic animal feeding apparatus according to claim 1 wherein said interrogating means, said memory means, said comparing means and said recording means are disposed in a unitary structure.

8. Automatic animal feeding apparatus according to claim 7 wherein said unitary structure includes a computer.

9. Automatic animal feeding apparatus according to claim 1 wherein said sensing means when activated provide a voltage drop to between about one-fifth and one-twelfth the original voltage.

* * * * *